United States Patent
Hsieh et al.

(10) Patent No.: US 12,500,807 B2
(45) Date of Patent: Dec. 16, 2025

(54) TRANSCEIVER SYSTEM AND CONTROL METHOD WITH IMPROVED PRE-DISTORTION EFFECT

(71) Applicant: Realtek Semiconductor Corporation, Hsinchu (TW)

(72) Inventors: Tzu-Hao Hsieh, Hsinchu (TW); Chih-Chieh Wang, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 22 days.

(21) Appl. No.: 18/442,068

(22) Filed: Feb. 14, 2024

(65) Prior Publication Data

US 2024/0283693 A1    Aug. 22, 2024

(30) Foreign Application Priority Data

Feb. 17, 2023 (TW) .................... 112105893

(51) Int. Cl.
*H04B 1/04* (2006.01)
*H04B 1/00* (2006.01)
*H04L 27/30* (2006.01)

(52) U.S. Cl.
CPC ........... *H04L 27/30* (2013.01); *H04B 1/0007* (2013.01); *H04B 1/04* (2013.01); *H04B 2001/0408* (2013.01)

(58) Field of Classification Search
CPC ..... H03F 1/26; H03F 1/32; H03F 3/19; H03F 3/21; H04B 1/00; H04B 1/04; H04B 1/12; H04B 1/16; H04B 1/38; H04B 1/40; H04B 1/0007; H04B 15/00; H04B 17/00; H04L 5/00; H04L 5/14; H04L 7/00; H04L 25/02; H04L 27/00; H04L 27/30; H04L 27/36
USPC ........ 330/109, 136, 149; 375/219, 260, 262, 375/267, 269, 295–297, 371; 455/13.4, 455/63.1, 67.11, 69, 75, 114.3, 115.1
See application file for complete search history.

(56) References Cited

U.S. PATENT DOCUMENTS

| | | | |
|---|---|---|---|
| 11,190,230 B1* | 11/2021 | Abramov | H04B 1/50 |
| 2004/0179629 A1* | 9/2004 | Song | H03F 1/3247 |
| | | | 375/296 |
| 2017/0194990 A1* | 7/2017 | Wang | H04L 27/0014 |

* cited by examiner

*Primary Examiner* — Shawkat M Ali
(74) *Attorney, Agent, or Firm* — CKC & Partners Co., LLC (57) ABSTRACT

A transceiver system includes a signal generator and controller circuit, a first signal converter circuit, an attenuator circuit, and a second signal converter circuit. Signal generator and controller circuit generates a transmitting baseband signal. First signal converter circuit generates a transmitting radio frequency signal according to transmitting baseband signal. Attenuator circuit generates an attenuated radio frequency signal according to transmitting radio frequency signal. Second signal converter circuit generates an attenuation range baseband reference signal according to attenuated radio frequency signal. Signal generator and controller circuit determines a first attenuation range for attenuator circuit according to attenuation range baseband reference signal when transmitting baseband signal is a dual-tone signal, and determines a second attenuation range from first attenuation range for attenuator circuit according to attenuation range baseband reference signal when transmitting baseband signal is a single-tone signal, and second attenuation range is for a pre-distortion process.

20 Claims, 7 Drawing Sheets

TRANSCEIVER SYSTEM AND CONTROL METHOD WITH IMPROVED PRE-DISTORTION EFFECT

RELATED APPLICATIONS

This application claims priority to Taiwanese Application Serial Number 112105893, filed Feb. 17, 2023, which is herein incorporated by reference.

BACKGROUND

Technical Field

The present disclosure relates to a pre-distortion process technology. More particularly, the present disclosure relates to a transceiver system and a control method with improved pre-distortion effect.

Description of Related Art

With the development of science and technology, many communication technologies have been developed. Take wireless communication as an example, multiple electronic devices can transmit signals to one another by utilizing wireless communication protocols. In the related art, a power amplifier is usually disposed in a communication device to amplify signals. However, the gain of the power amplifier is not completely linear. That is to say, the output signal of the power amplifier has the problem of distortion.

SUMMARY

Some aspects of the present disclosure provide a transceiver system with improved pre-distortion effect. The transceiver system includes a signal generator and controller circuit, a first signal converter circuit, an attenuator circuit, and a second signal converter circuit. The signal generator and controller circuit is configured to generate a transmitting baseband signal. The transmitting baseband signal is a dual-tone signal or a single-tone signal. The first signal converter circuit is configured to generate a transmitting radio frequency signal according to the transmitting baseband signal. The attenuator circuit is configured to generate an attenuated radio frequency signal according to the transmitting radio frequency signal. The second signal converter circuit is configured to generate an attenuation range baseband reference signal according to the attenuated radio frequency signal. The signal generator and controller circuit is further configured to determine a first attenuation range for the attenuator circuit according to the attenuation range baseband reference signal when the transmitting baseband signal is the dual-tone signal, and determine a second attenuation range from the first attenuation range for the attenuator circuit according to the attenuation range baseband reference signal when the transmitting baseband signal is the single-tone signal, and the second attenuation range is for a pre-distortion process.

Some aspects of the present disclosure provide a control method with improved pre-distortion effect. The control method includes the following operations: generating, by a signal generator and controller circuit, a first transmitting baseband signal, in which the first transmitting baseband signal is a dual-tone signal; generating, by a first signal converter circuit, an attenuator circuit, and a second signal converter circuit, a first attenuation range baseband reference signal according to the first transmitting baseband signal; determining, by the signal generator and controller circuit, a first attenuation range for the attenuator circuit according to the first attenuation range baseband reference signal; generating, by the signal generator and controller circuit, a second transmitting baseband signal, in which the second transmitting baseband signal is a single-tone signal; generating, by the first signal converter circuit, the attenuator circuit, and the second signal converter circuit, a second attenuation range baseband reference signal according to the second transmitting baseband signal; and determining, by the signal generator and controller circuit, a second attenuation range from the first attenuation range for the attenuator circuit according to the second attenuation range baseband reference signal, in which the second attenuation range is for a pre-distortion process.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
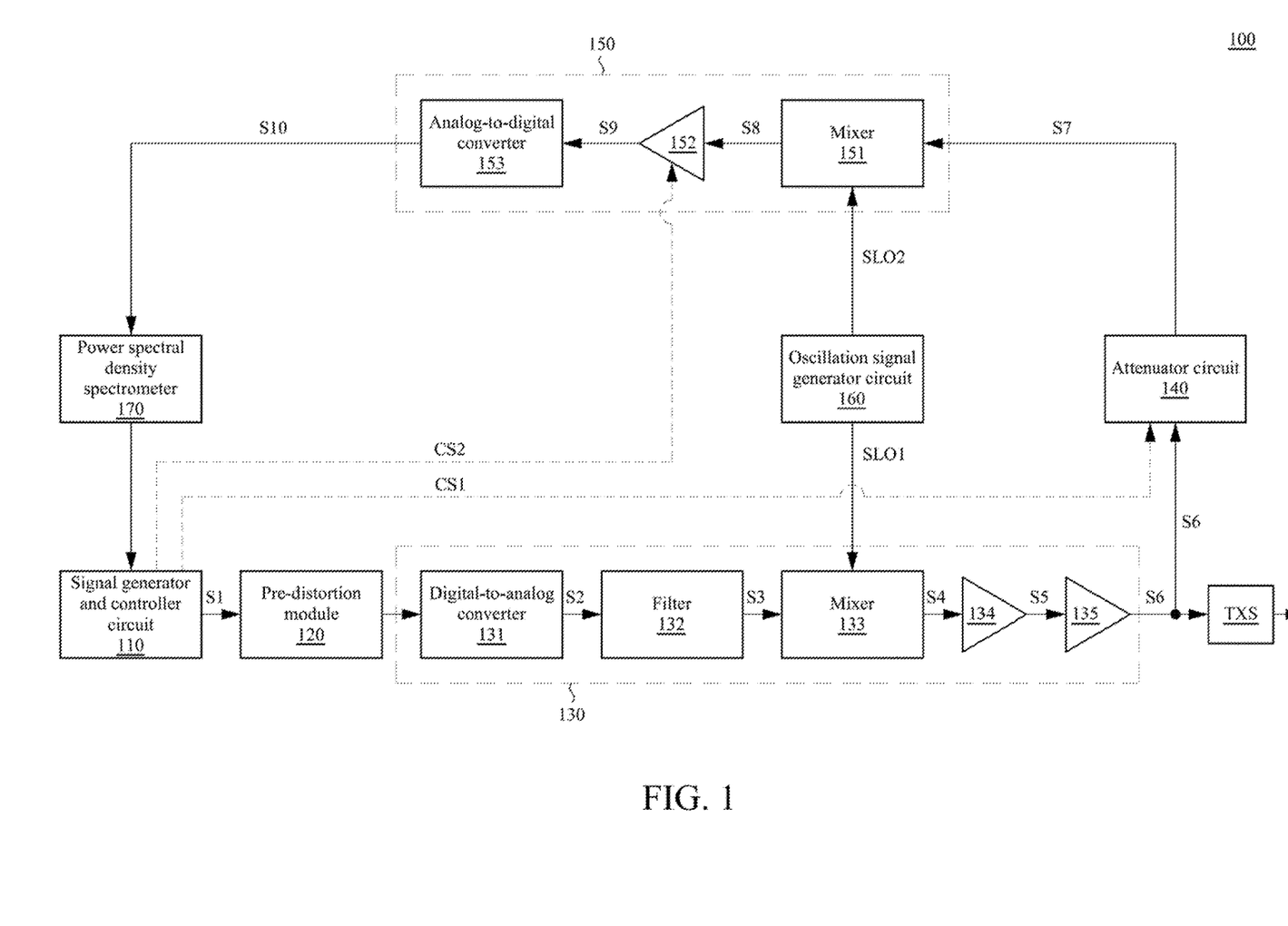
FIG. 1 depicts a schematic diagram of a transceiver system according to some embodiments of the present disclosure.

Reference is made to FIG. 1. FIG. 1 depicts a schematic diagram of a transceiver system 100 according to some embodiments of the present disclosure. In some embodiments, the transceiver system 100 is a transceiver device in a wireless communication network.

As illustrated in FIG. 1, the transceiver system 100 includes a signal generator and controller circuit 110, a pre-distortion module 120, a signal converter circuit 130, an attenuator circuit 140, a signal converter circuit 150, an oscillation signal generator circuit 160, and a power spectral density (PSD) spectrometer 170.

In terms of coupling relationships, the signal generator and controller circuit 110 is coupled to the pre-distortion module 120. The pre-distortion module 120 is coupled to the signal converter circuit 130. The signal converter circuit 130 is coupled to the attenuator circuit 140. The attenuator circuit 140 is coupled to the signal converter circuit 150. The signal converter circuit 150 is coupled to the power spectral density spectrometer 170. The power spectral density spectrometer 170 is coupled to the signal generator and controller circuit 110. The oscillation signal generator circuit 160 is coupled to the signal converter circuit 130 and the signal converter circuit 150.

In terms of operations, the signal generator and controller circuit 110 can generate a transmitting baseband signal S1. In some embodiments, the signal generator and controller circuit 110 may be implemented by an application specific integrated circuit (ASIC), but the present disclosure is not limited thereto. For example, the signal generator and controller circuit 110 can be implemented by using a signal generator in cooperation with a controller.

Figure 2:
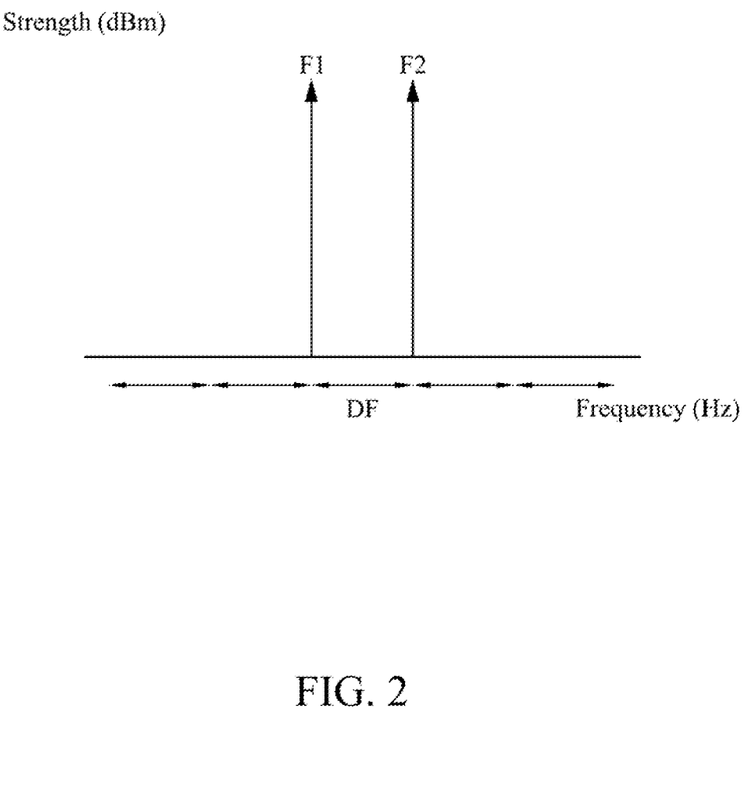
FIG. 2 depicts a schematic diagram of a dual-tone signal according to some embodiments of the present disclosure.
Figure 3:
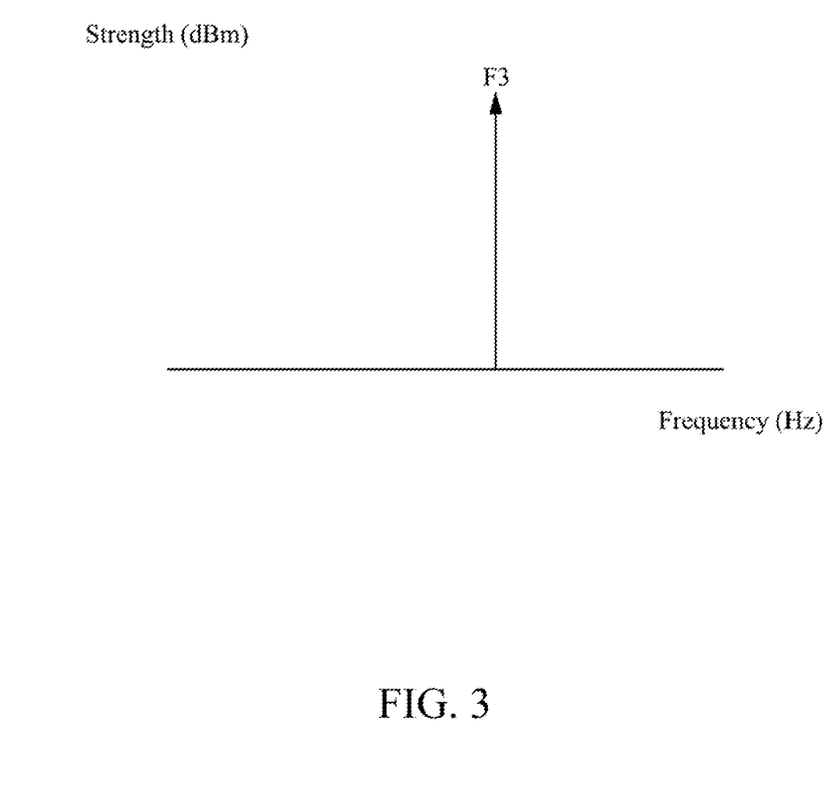
FIG. 3 depicts a schematic diagram of a single-tone signal according to some embodiments of the present disclosure.

FIG. 2 depicts a schematic diagram of a dual-tone signal according to some embodiments of the present disclosure. FIG. 3 depicts a schematic diagram of a single-tone signal according to some embodiments of the present disclosure. In FIG. 2 or FIG. 3, the horizontal axis represents frequency and the corresponding unit is Hertz (Hz), and the vertical axis represents signal power strength and the corresponding unit is decibel relative to one milliwatt (dBm).

In some embodiments, the transmitting baseband signal S1 generated by the signal generator and controller circuit 110 in FIG. 1 can be the dual-tone signal in FIG. 2 or the single-tone signal in FIG. 3. As illustrated in FIG. 2, dual tones correspond to a frequency F1 and a frequency F2, and there is a frequency interval DF between the frequency F1 and the frequency F2. As illustrated in FIG. 3, a single tone corresponds to a frequency F3. The frequency F3 can be the same as the frequency F1 or the frequency F2, or can be different from the frequency F1 and the frequency F2.

Reference is made to FIG. 1 again. The pre-distortion module 120 can be a digital pre-distortion (DPD) module. In some embodiments, the pre-distortion module 120 is implemented by utilizing software in cooperation with hardware. The software is, for example, computer program codes including a digital pre-distortion algorithm, and the hardware is, for example, a processor capable of executing the above computer program codes. The processor can execute the digital pre-distortion process by executing the above computer program codes. In some embodiments, the pre-distortion module 120 is implemented only by hardware (for example: digital pre-distortion compensation circuit) to execute the digital pre-distortion process. The details of the "pre-distortion process" are described in the following paragraphs with reference to FIG. 4.

The signal converter circuit 130 can generate a transmitting radio frequency signal S6 according to the transmitting baseband signal S1. As illustrated in FIG. 1, the signal converter circuit 130 includes a digital-to-analog converter 131, a filter 132, a mixer 133, a power amplifier driver (PAD) 134, and a power amplifier 135.

The digital-to-analog converter 131 can convert the digital transmitting baseband signal S1 or a digital output signal processed by the pre-distortion module 120 into an analog signal S2. The filter 132 can filter the analog signal S2 to generate a filtered signal S3. The mixer 133 can mix the filtered signal S3 and an oscillation signal SLO1 from the oscillation signal generator circuit 160 to generate a radio frequency signal S4. The power amplifier driver 134 can generate a pre-amplified signal S5 according to the radio frequency signal S4. The power amplifier 135 can amplify the pre-amplified signal S5 to generate the transmitting radio frequency signal S6.

The attenuator circuit 140 can generate an attenuated radio frequency signal S7 according to the received transmitting radio frequency signal S6. In some embodiments, the attenuator circuit 140 includes an attenuator and the attenuator can attenuate signal strength of the transmitting radio frequency signal S6 so as to generate the attenuated radio frequency signal S7. The disposing of the attenuator circuit 140 can also provide a feedback path for the feedback of the transmitting radio frequency signal S6.

In practical applications, an attenuation amount provided by attenuator circuit 140 can allow a mixer 151 to be in a normal operation state. If the signal is too strong, a nonlinear component of the mixer 151 may be generated, which causes that an output baseband signal includes the nonlinear component of the mixer 151. In addition, a signal received by an analog-to-digital converter 153 cannot be too strong. If the signal is stronger than the dynamic input range of the analog-to-digital converter 153, the analog-to-digital converter 153 can also generate a nonlinear component, thus resulting in distortion and misjudge. At this time, the nonlinear component seen by the power spectral density spectrometer 170 is not simply caused by the power amplifier 135.

Figure 6:
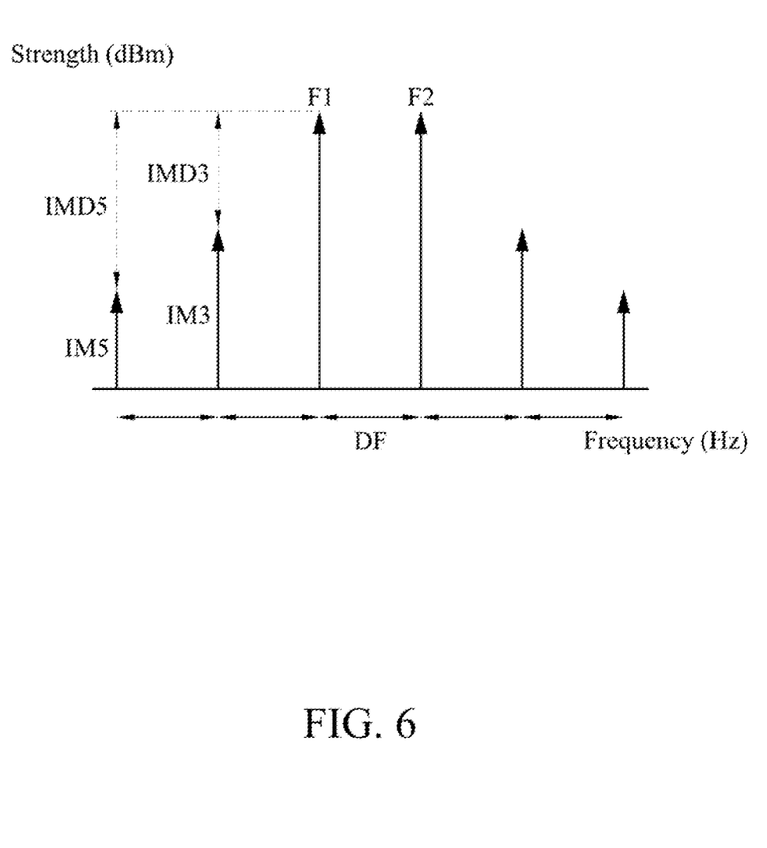
FIG. 6 depicts a schematic diagram of a power spectral density according to some embodiments of the present disclosure.
Figure 7:
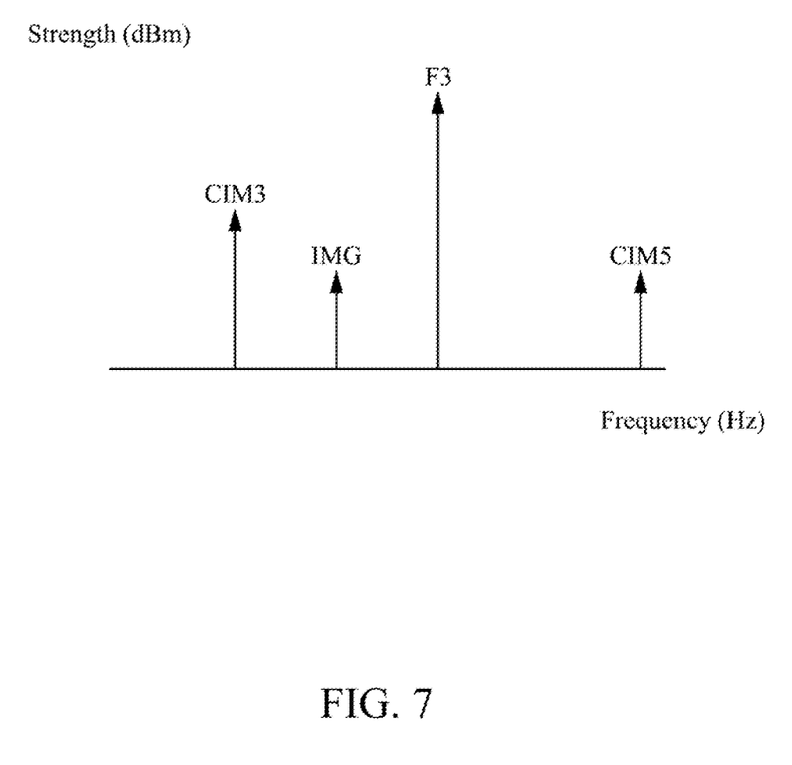
FIG. 7 depicts a schematic diagram of a power spectral density according to some embodiments of the present disclosure.

The signal converter circuit 150 can generate an attenuation range baseband reference signal S10 according to the attenuated radio frequency signal S7. As illustrated in FIG. 1, the signal converter circuit 150 includes the mixer 151, a programmable gain amplifier (PGA) 152, and the analog-to-digital converter 153. The mixer 151 can mix the attenuated radio frequency signal S7 and an oscillation signal SLO2 from the oscillation signal generator circuit 160 to generate a baseband signal S8. The programmable gain amplifier 152 can amplify the baseband signal S8 to generate an amplified signal S9, and a gain of the programmable gain amplifier 152 can be dynamically adjusted according to practical needs. The analog-to-digital converter 153 can convert the analog amplified signal S9 into the digital attenuation range baseband reference signal S10. The power spectral density spectrometer 170 can measure and display the power spectral density of the attenuation range baseband reference signal S10 (as shown in FIG. 6 and FIG. 7).

In practical applications, the power amplifier 135 usually has a distortion problem. The pre-distortion process executed by the pre-distortion module 120 can be used to compensate for the distortion problem of the power amplifier 135.

Figure 4:
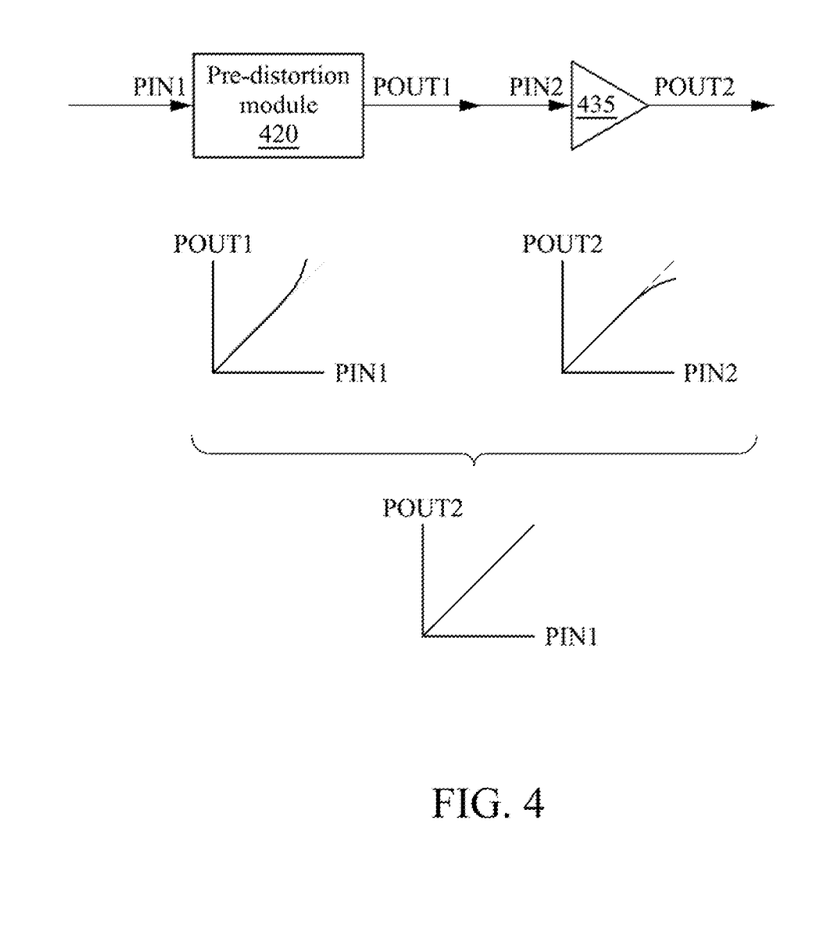
FIG. 4 depicts a schematic diagram of a pre-distortion process according to some embodiments of the present disclosure.

Reference is made to FIG. 4. FIG. 4 depicts a schematic diagram of a pre-distortion process according to some embodiments of the present disclosure. The implementation method of a pre-distortion module 420 can be the same as the implementation method of the above pre-distortion module 120. The implementation method of a power amplifier 435 can be the same as the implementation method of the above power amplifier 135, and the pre-distortion process executed by the pre-distortion module 420 can be used to compensate for a distortion problem of the power amplifier 435.

As illustrated in FIG. 4, the power amplifier 435 can amplify an input signal PIN2 to generate an output signal POUT2. A ratio of power of the output signal POUT2 to power of the input signal PIN2 is "gain." When the power of the input signal PIN2 is smaller, the relation between the power of the output signal POUT2 and the power of the input signal PIN2 is linear (the gain is close to a constant value). However, as the power of the input signal PIN2 increases, the relationship between the power of the output signal POUT2 and the power of the input signal PIN2 gradually becomes nonlinear (the gain is not a constant value). This phenomenon is the distortion problem of the power amplifier 435.

The relationship between the power of the output signal POUT2 and the power of the input signal PIN2 can be represented by a transfer function, and the pre-distortion process executed by the pre-distortion module 420 uses an inverse function signal to compensate for the transfer function of the power amplifier 435. As illustrated in FIG. 4, the pre-distortion module 420 can generate an output signal POUT1 according to an input signal PIN1. By controlling the relationship between the power of the output signal POUT1 and the power of the input signal PIN1, the non-linear part of the power amplifier 435 can be compensated, so that the relationship between the overall output power (the power of the output signal POUT2) and the overall input power (the power of the input signal PIN1) is linear (the gain is close to the constant value). As a result, the distortion problem of the power amplifier 435 is resolved.

Reference is made to FIG. 1 again. The signal generator and controller circuit 110 is further directly coupled to the attenuator circuit 140 and the programmable gain amplifier 152. The signal generator and controller circuit 110 can generate a control signal CS1 and a control signal CS2 according to measurement results of the power spectral density spectrometer 170 (FIG. 6 and FIG. 7) to respectively control the attenuation amount of the attenuator circuit 140 and the gain of the programmable gain amplifier 152.

Figure 5:
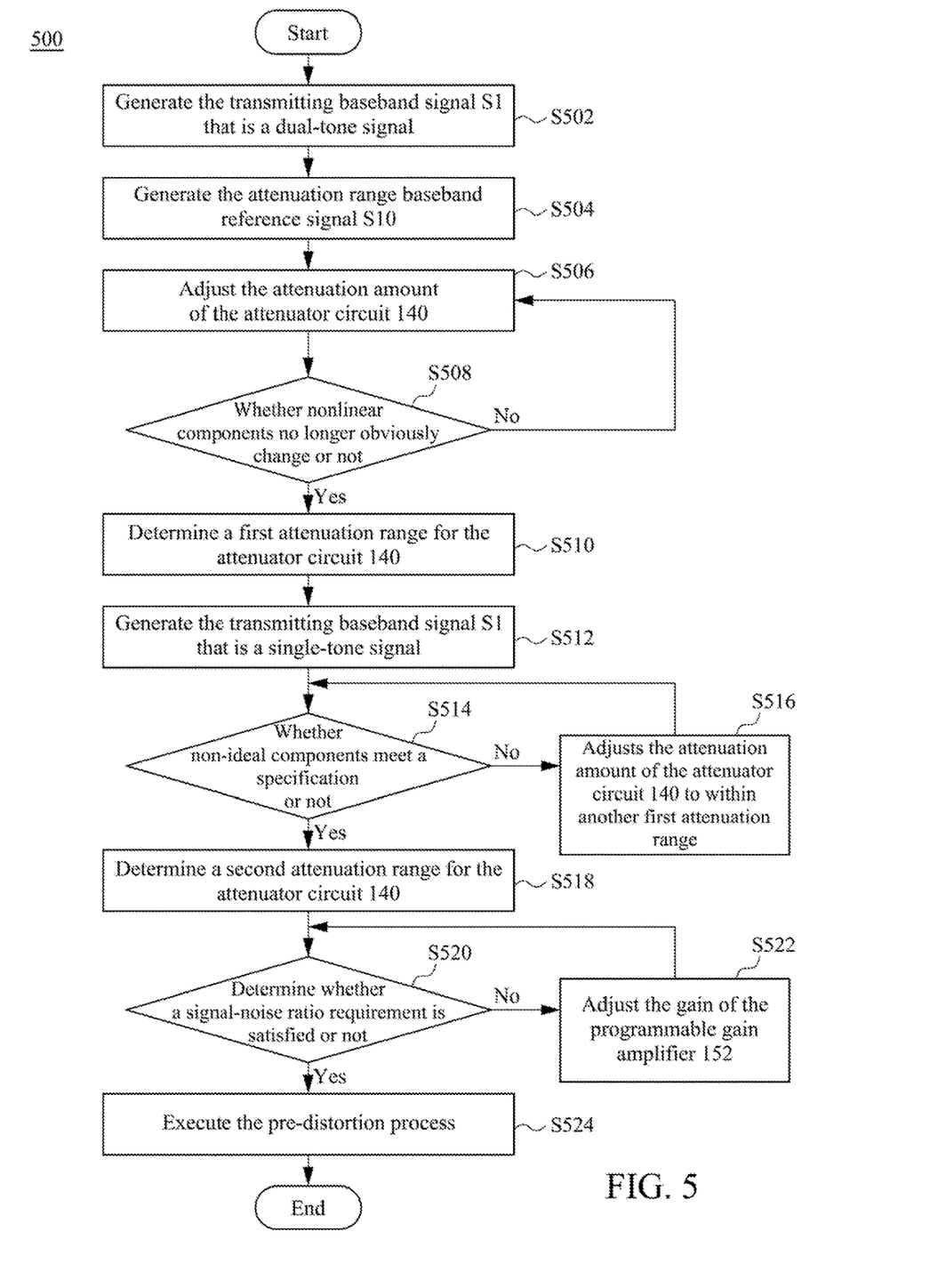
FIG. 5 depicts a flowchart of a control method with improved a pre-distortion effect according to some embodiments of the present disclosure.

Reference is made to FIG. 5. FIG. 5 depicts a flowchart of a control method 500 with improved pre-distortion effect according to some embodiments of the present disclosure.

In some embodiments, the control method 500 can be used to improve the pre-distortion effect of the transceiver system 100 in FIG. 1. However, the present disclosure is not limited thereto. For ease of understanding, the control method 500 will be described with reference to the transceiver system 100 of FIG. 1 in the following paragraphs.

As illustrated in FIG. 5, the control method 500 includes an operation S502, an operation S504, an operation S506, an operation S508, an operation S510, an operation S512, an operation S514, an operation S516, an operation S518, an operation S520, an operation S522, and an operation S524.

In operation S502, the signal generator and controller circuit 110 generates the transmitting baseband signal S1 that is a dual-tone signal, as shown in FIG. 2.

In operation S504, the signal converter circuit 130, the attenuator circuit 140, and the signal converter circuit 150 generate the attenuation range baseband reference signal S10 correspondingly according to the transmitting baseband signal S1 that is the dual-tone signal. At this time, the pre-distortion module 120 does not operate. That is to say, the transmitting baseband signal S1 generated by the signal generator and controller circuit 110 is directly transmitted to the signal converter circuit 130. The signal converter circuit 130 generates the transmitting radio frequency signal S6 according to the transmitting baseband signal S1. Then, the attenuator circuit 140 generates the attenuated radio frequency signal S7 according to the transmitting radio frequency signal S6, and the signal converter circuit 150 generates the attenuation range baseband reference signal S10 according to the attenuated radio frequency signal S7.

In operation S506, the signal generator and controller circuit 110 can output the control signal CS1 to the attenuator circuit 140 to adjust an attenuation amount of the attenuator circuit 140. In some embodiments, when entering operation S506 for the first time, the attenuation amount of the attenuator circuit 140 can be adjusted to a preset initial attenuation amount and a gain of the programmable gain amplifier 152 can be adjusted to a preset gain. Then, the control method 500 enters operation S508.

In operation S508, the power spectral density spectrometer 170 measures the power spectral density of the attenuation range baseband reference signal S10 at this time, and the signal generator and controller circuit 110 determines whether nonlinear components no longer obviously change or not. FIG. 6 depicts a schematic diagram of a power spectral density according to some embodiments of the present disclosure. As illustrated in FIG. 6, in addition to the corresponding signal components at the frequency F1 and the frequency F2, there are still nonlinear components (e.g., noises). The nonlinear components in FIG. 6 include a third-order intermodulation component IM3 and a fifth-order intermodulation component IM5. A strength difference between the signal component at the frequency F1 and the third-order intermodulation component IM3 is called a third-order intermodulation distortion IMD3. A strength difference between the signal component at the frequency F1 and the fifth-order intermodulation component IM5 is called a fifth-order intermodulation distortion IMD5.

Generally speaking, nonlinear characteristics of the power amplifier 135 will lead to the generation of the third-order intermodulation component IM3 and the fifth-order intermodulation component IM5. When the attenuation of the attenuator circuit 140 is insufficient, the third-order intermodulation component IM3 and the fifth-order intermodulation component IM5 will change drastically as the attenuation of the attenuator circuit 140 changes, and the third-order intermodulation distortion IMD3 and the fifth-order intermodulation distortion IMD5 will also change drastically as the attenuation of the attenuator circuit 140 changes. Additionally, the mixer 151 and the analog-to-digital converter 153 will also generate nonlinear components when the attenuation is insufficient.

Based on the above, when the signal generator and controller circuit 110 determines that change amounts of the third-order intermodulation distortion IMD3 and the fifth-order intermodulation distortion IMD5 are lower than a change threshold (no drastic changes occur), it represents that the nonlinear component at this time is mainly generated due to the nonlinear characteristic of the power amplifier 135 (not due to the insufficient attenuation of the attenuator circuit 140). Therefore, the control method 500 enters operation S510 and the signal generator and controller circuit 110 determines a first attenuation range for the attenuator circuit 140. In other words, the first attenuation range is an attenuation range in which strengths of the third-order intermodulation distortion IMD3 and the fifth-order intermodulation distortion IMD5 do not change obviously, and at this time the third-order intermodulation component IM3 and the fifth-order intermodulation component IM5 can faithfully reflect the nonlinear characteristic of the power amplifier 135. In some embodiments, the attenuator circuit 140 can correspond to more than one (multiple) first attenuation ranges.

On the contrary, when the signal generator and controller circuit 110 determines that the change amount of the third-order intermodulation distortion IMD3 or the fifth-order intermodulation distortion IMD5 is higher than or equal to the change threshold, it represents that the nonlinear component at this time is mainly generated due to the insufficient attenuation of the attenuator circuit 140. Accordingly, the control method 500 enters operation S506 and the signal generator and controller circuit 110 continues to adjust the attenuation amount of the attenuator circuit 140.

After the first attenuation range is determined, the control method 500 enters operation S512. In operation S512, the signal generator and controller circuit 110 generates the transmitting baseband signal S1 that is a single-tone signal, as shown in FIG. 3. Similar to operation S504, the signal converter circuit 130, the attenuator circuit 140, and the signal converter circuit 150 can generate the corresponding attenuation range baseband reference signal S10 according to the transmitting baseband signal S1 that is the single-tone signal.

In operation S514, the power spectral density spectrometer 170 measures the power spectral density of the attenuation range baseband reference signal S10 at this time, and the signal generator and controller circuit 110 determines whether non-ideal components meet a specification or not. FIG. 7 depicts a schematic diagram of a power spectral density according to some embodiments of the present disclosure. As illustrated in FIG. 7, in addition to the signal component at the frequency F3, there are still other non-ideal components (e.g., noises). The non-ideal components in FIG. 7 include a third-order counter intermodulation component CIM3, a fifth-order counter intermodulation component CIM5, and an unbalanced component IMG (e.g., an IQ imbalance). The third-order counter intermodulation component CIM3 and the fifth-order counter intermodulation component CIM5 are mainly generated based on an impedance change or a nonlinear characteristic of another component. The unbalanced component IMG is mainly generated based on an asymmetrical feature (an asymmetrical circuit or an asymmetrical circuit layout) (a non-ideal feature).

When the signal generator and controller circuit 110 determines that signal power strengths of the third-order counter intermodulation component CIM3, the fifth-order counter intermodulation component CIM5, and the unbalanced component IMG are lower than a strength threshold, it represents that the non-ideal components meet the specification. The non-ideal characteristic of the attenuation range causes less influence on the pre-distortion process. Therefore, the control method 500 enters operation S518, the signal generator and controller circuit 110 determines a second attenuation range from the first attenuation range, and the second attenuation range can faithfully reflect the nonlinear characteristic of the power amplifier 135 and has the less influence on the pre-distortion process.

On the contrary, when the signal generator and controller circuit 110 determines that the signal power strength of the third-order counter intermodulation component CIM3, the fifth-order counter intermodulation component CIM5, or the unbalanced component IMG is higher than or equal to the strength threshold, it represents that the non-ideal components do not meet the specification. Therefore, the control method 500 returns to operation S516 and the signal generator and controller circuit 110 adjusts the attenuation amount of the attenuator circuit 140 to within another first attenuation range.

After the second attenuation range is determined, the control method 500 enters operation S520. In some embodiments, when entering operation S520 for the first time, the attenuation amount of the attenuator circuit 140 can be a preset attenuation amount in the second attenuation range and the gain of the programmable gain amplifier 152 can be a preset gain. The signal generator and controller circuit 110 can judge a measurement result of the power spectral density spectrometer 170 to determine whether a signal-noise ratio (SNR) requirement is satisfied or not. When the signal-noise ratio requirement is satisfied, the control method 500 enters operation S524 to execute the pre-distortion process by utilizing the above preset attenuation amount and preset gain.

On the contrary, when the signal-noise ratio requirement is not satisfied, the control method 500 enters operation S522. In operation S522, the signal generator and controller circuit 110 can output the control signal CS2 to the programmable gain amplifier 152 so as to adjust the gain of the programmable gain amplifier 152. Under a condition that the attenuation amount of the attenuator circuit 140 is the above preset attenuation amount, if the signal-noise ratio requirement cannot be satisfied by all adjustable gain ranges of the programmable gain amplifier 152, the signal generator and controller circuit 110 will select another attenuation amount from the second attenuation range and synchronously adjust the gain of the programmable gain amplifier 152 until the signal-noise ratio requirement is satisfied.

In some embodiments, the control method 500 is repeatedly executed to check different dual-tone signals and single-tone signals correspondingly.

After a final attenuation amount of the attenuator circuit 140 and a final gain of the programmable gain amplifier 152 are determined, it means that the transceiver system 100 has been set to a state where the pre-distortion effect can be improved more effectively. Accordingly, the subsequent pre-distortion process can more effectively compensate for the distortion problem of the power amplifier 135 so as to improve the overall linearity. That is to say, after the final attenuation amount of the attenuator circuit 140 and the final gain of the programmable gain amplifier 152 are determined, the pre-distortion module 120 can start to operate to execute the pre-distortion process for the power amplifier 135, so that the transceiver system 100 generates a better transmitting signal TXS. The transmitting signal TXS can be transmitted to a receiving system or another transceiver system.

Some related approaches execute pre-distortion processes at the radio frequency ends. However, it is more difficult and complicated to configure the pre-distortion process at the radio frequency ends.

As compared with the above related approaches, the present disclosure executes the pre-distortion process at the baseband end. The first attenuation range can faithfully reflect the nonlinear characteristic of the power amplifier 135, and the second attenuation range in the first attenuation range is the attenuation range that has the less influence on the pre-distortion process. As a result, the subsequent pre-distortion process can more effectively compensate for the distortion problem of the power amplifier 135 so as to improve the overall linearity.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A transceiver system with improved pre-distortion effect, the transceiver system comprising:
   a signal generator and controller circuit configured to generate a transmitting baseband signal;
   a first signal converter circuit configured to generate a transmitting radio frequency signal according to the transmitting baseband signal;

an attenuator circuit configured to generate an attenuated radio frequency signal according to the transmitting radio frequency signal; and a second signal converter circuit configured to generate an attenuation range baseband reference signal according to the attenuated radio frequency signal, wherein the signal generator and controller circuit is further configured to determine a first attenuation range for the attenuator circuit according to the attenuation range baseband reference signal when the transmitting baseband signal is a dual-tone signal, and determine a second attenuation range from the first attenuation range for the attenuator circuit according to the attenuation range baseband reference signal when the transmitting baseband signal is a single-tone signal, and wherein the second attenuation range is for a pre-distortion process.

2. The transceiver system of claim 1, wherein in the first attenuation range, a change amount of at least one intermodulation distortion in the attenuation range baseband reference signal is lower than a change threshold.

3. The transceiver system of claim 2, wherein the at least one intermodulation distortion is a strength difference between the dual-tone signal and an intermodulation component, and the intermodulation component reflects a nonlinear characteristic of a power amplifier in the first signal converter circuit.

4. The transceiver system of claim 1, wherein in the second attenuation range, a strength of at least one non-ideal component in the attenuation range baseband reference signal is lower than a strength threshold.

5. The transceiver system of claim 4, wherein the at least one non-ideal component comprises a counter intermodulation component or an unbalanced component and wherein the at least one non-ideal component reflects an impedance change or an asymmetrical feature.

6. The transceiver system of claim 1, wherein the first signal converter circuit comprises:
    a digital-to-analog converter configured to generate an analog signal according to the transmitting baseband signal;
    a filter configured to generate a filtered signal according to the analog signal;
    a mixer configured to generate a radio frequency signal according to the filtered signal and an oscillation signal;
    a power amplifier driver configured to generate a pre-amplified signal according to the radio frequency signal; and
    a power amplifier configured to generate the transmitting radio frequency signal according to the pre-amplified signal.

7. The transceiver system of claim 1, wherein the second signal converter circuit comprises:
    a mixer configured to generate a baseband signal according to the attenuated radio frequency signal and an oscillation signal;
    a programmable gain amplifier configured to generate an amplified signal according to the baseband signal; and
    an analog-to-digital converter configured to generate the attenuation range baseband reference signal according to the amplified signal.

8. The transceiver system of claim 7, wherein the signal generator and controller circuit is further configured to determine an attenuation amount of the attenuator circuit from the second attenuation range and a gain of the programmable gain amplifier when the transmitting baseband signal is the single-tone signal to satisfy a signal-noise ratio requirement.

9. The transceiver system of claim 8, wherein the pre-distortion process is executed based on the attenuation amount of the attenuator circuit and the gain of the programmable gain amplifier.

10. The transceiver system of claim 8, wherein the signal generator and controller circuit is directly coupled to the attenuator circuit and the programmable gain amplifier, and is further configured to generate a first control signal and a second control signal to respectively control the attenuator circuit and the programmable gain amplifier.

11. A control method with improved pre-distortion effect, the control method comprising:
    generating, by a signal generator and controller circuit, a first transmitting baseband signal, wherein the first transmitting baseband signal is a dual-tone signal;
    generating, by a first signal converter circuit, an attenuator circuit, and a second signal converter circuit, a first attenuation range baseband reference signal according to the first transmitting baseband signal;
    determining, by the signal generator and controller circuit, a first attenuation range for the attenuator circuit according to the first attenuation range baseband reference signal;
    generating, by the signal generator and controller circuit, a second transmitting baseband signal, wherein the second transmitting baseband signal is a single-tone signal;
    generating, by the first signal converter circuit, the attenuator circuit, and the second signal converter circuit, a second attenuation range baseband reference signal according to the second transmitting baseband signal; and
    determining, by the signal generator and controller circuit, a second attenuation range from the first attenuation range for the attenuator circuit according to the second attenuation range baseband reference signal, wherein the second attenuation range is for a pre-distortion process.

12. The control method of claim 11, wherein in the first attenuation range, a change amount of at least one intermodulation distortion in the first attenuation range baseband reference signal is lower than a change threshold.

13. The control method of claim 12, wherein the at least one intermodulation distortion is a strength difference between the dual-tone signal and an intermodulation component, and the intermodulation component reflects a nonlinear characteristic of a power amplifier in the first signal converter circuit.

14. The control method of claim 11, wherein in the second attenuation range, a strength of at least one non-ideal component in the second attenuation range baseband reference signal is lower than a strength threshold.

15. The control method of claim 14, wherein the at least one non-ideal component comprises a counter intermodulation component or an unbalanced component and wherein the at least one non-ideal component reflects an impedance change or an asymmetrical feature.

16. The control method of claim 11, further comprising:
    generating, by a digital-to-analog converter in the first signal converter circuit, an analog signal according to the first transmitting baseband signal or the second transmitting baseband signal;
    generating, by a filter in the first signal converter circuit, a filtered signal according to the analog signal;

generating, by a first mixer in the first signal converter circuit, a radio frequency signal according to the filtered signal and a first oscillation signal;

generating, by a power amplifier driver in the first signal converter circuit a pre-amplified signal according to the radio frequency signal; and generating, by a power amplifier in the first signal converter circuit, a transmitting radio frequency signal according to the pre-amplified signal.

17. The control method of claim 16, further comprising:

generating, by the attenuator circuit, an attenuated radio frequency signal according to the transmitting radio frequency signal;

generating, by a second mixer in the second signal converter circuit, a baseband signal according to the attenuated radio frequency signal and a second oscillation signal;

generating, by a programmable gain amplifier in the second signal converter circuit, an amplified signal according to the baseband signal; and generating, by an analog-to-digital converter in the second signal converter circuit, the first attenuation range baseband reference signal or the second attenuation range baseband reference signal according to the amplified signal.

18. The control method of claim 17, further comprising:

determining, by the signal generator and controller circuit, an attenuation amount of the attenuator circuit from the second attenuation range and a gain of the programmable gain amplifier to satisfy a signal-noise ratio requirement.

19. The control method of claim 18, further comprising:

executing the pre-distortion process based on the attenuation amount of the attenuator circuit and the gain of the programmable gain amplifier.

20. The control method of claim 17, further comprising:

generating, by the signal generator and controller circuit, a first control signal and a second control signal to respectively control the attenuator circuit and the programmable gain amplifier.

\* \* \* \* \*